US012231892B2

(12) United States Patent
Elsins et al.

(10) Patent No.: US 12,231,892 B2
(45) Date of Patent: *Feb. 18, 2025

(54) SYSTEMS FOR AUTOMATIC SECURED REMOTE ACCESS TO A LOCAL NETWORK

(71) Applicant: Ubiquiti Inc., New York, NY (US)

(72) Inventors: Kristaps Elsins, New York, NY (US); Andrejs Hanins, New York, NY (US); Robert J. Pera, Seattle, WA (US); Oskars Verza, Riga (LV); Andris Lejasmeiers, Riga (LV); Gunars Ritins, Broomfield, CO (US)

(73) Assignee: Ubiquiti Inc., New York, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/676,061

(22) Filed: Feb. 18, 2022

(65) Prior Publication Data

US 2022/0174493 A1  Jun. 2, 2022

Related U.S. Application Data

(63) Continuation-in-part of application No. 16/145,157, filed on Sep. 27, 2018, now Pat. No. 11,258,764.

(60) Provisional application No. 62/564,251, filed on Sep. 27, 2017.

(51) Int. Cl.
| | | |
|---|---|---|
| *H04W 12/08* | (2021.01) | |
| *H04L 12/46* | (2006.01) | |
| *H04W 12/037* | (2021.01) | |
| *H04W 12/086* | (2021.01) | |
| *H04W 12/61* | (2021.01) | |

(52) U.S. Cl.
CPC ....... *H04W 12/086* (2021.01); *H04L 12/4641* (2013.01); *H04W 12/037* (2021.01); *H04W 12/61* (2021.01)

(58) Field of Classification Search
CPC . H04W 12/086; H04W 12/037; H04W 12/61; H04W 12/069; H04L 12/4641; H04L 63/0272; H04L 63/0823; H04L 63/108; H04L 12/2834
See application file for complete search history.

(56) References Cited

U.S. PATENT DOCUMENTS

| | | |
|---|---|---|
| 5,131,006 A | 7/1992 | Kamerman et al. |
| 5,151,920 A | 9/1992 | Haagh et al. |
| 5,295,154 A | 3/1994 | Meier et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |
| 5,546,397 A | 8/1996 | Mahany |
| 5,706,428 A | 1/1998 | Boer et al. |
| 5,740,366 A | 4/1998 | Mahany et al. |
| 5,844,893 A | 12/1998 | Gollnick et al. |

(Continued)

FOREIGN PATENT DOCUMENTS

| | | |
|---|---|---|
| CN | 102075339 A | 5/2011 |
| CN | 104365056 A | 2/2015 |

(Continued)

*Primary Examiner* — Harunur Rashid
(74) *Attorney, Agent, or Firm* — Shay Glenn LLP

(57) ABSTRACT

Apparatuses (e.g., systems and devices) and methods for remotely accessing a local (e.g., home, office, etc.) network of devices connected to a local router.

4 Claims, 14 Drawing Sheets

(56) References Cited

U.S. PATENT DOCUMENTS

| | | |
|---|---|---|
| 5,936,542 A | 8/1999 | Kleinrock et al. |
| 5,940,771 A | 8/1999 | Gollnick et al. |
| 6,130,892 A | 10/2000 | Short et al. |
| 6,194,992 B1 | 2/2001 | Short et al. |
| 6,337,990 B1 | 1/2002 | Koshino |
| 6,374,311 B1 | 4/2002 | Mahany et al. |
| 6,563,786 B1 | 5/2003 | Van Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 7,020,082 B2 | 3/2006 | Bhagavath et al. |
| 7,088,727 B1 | 8/2006 | Short et al. |
| 7,117,526 B1 | 10/2006 | Short |
| 7,194,554 B1 | 3/2007 | Short et al. |
| 7,197,556 B1 | 3/2007 | Short et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,739,383 B1 | 6/2010 | Short et al. |
| 7,752,334 B2 | 7/2010 | Paunikar et al. |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,483,188 B2 | 7/2013 | Walton et al. |
| 11,258,764 B2 | 2/2022 | Elsins et al. |
| 2002/0066029 A1 | 5/2002 | Yi |
| 2002/0133614 A1 | 9/2002 | Weerahandi et al. |
| 2003/0069972 A1* | 4/2003 | Yoshimura .......... H04L 12/4645 709/226 |
| 2006/0036854 A1 | 2/2006 | Liu et al. |
| 2006/0039356 A1* | 2/2006 | Rao ..................... H04L 47/2416 370/352 |
| 2009/0080333 A1 | 3/2009 | Ozer et al. |
| 2010/0217837 A1* | 8/2010 | Ansari ................ H04L 12/2812 709/224 |
| 2010/0309894 A1 | 12/2010 | Csaszar et al. |
| 2013/0182651 A1* | 7/2013 | Kelkar ................ H04L 61/5038 370/329 |
| 2014/0286348 A1* | 9/2014 | Haddad ................. H04L 63/08 370/401 |
| 2015/0017930 A1 | 1/2015 | Rivera |
| 2015/0052192 A1* | 2/2015 | Chauhan ............ H04L 67/5681 709/203 |
| 2015/0256355 A1* | 9/2015 | Pera .................... H04L 12/2816 700/90 |
| 2016/0094994 A1* | 3/2016 | Kirkby ................ G11B 27/031 380/270 |

FOREIGN PATENT DOCUMENTS

| | | |
|---|---|---|
| CN | 106685956 A | 5/2017 |
| EP | 2677715 A1 | 12/2013 |
| EP | 2803177 A2 | 11/2014 |
| JP | 2004328230 A | 11/2004 |
| JP | 2011211306 A | 10/2011 |
| JP | 5408167 B2 | 2/2017 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2009/030282 A1 | 3/2009 |
| WO | WO2011/005710 A2 | 1/2011 |

* cited by examiner

| Dimensions | 43.00 x 75.85 x 38.85 mm (1.69 x 2.95 x 1.53") |
|---|---|
| Weight | 80 g (2.82 oz) |
| Max. TX Power | 19 dBm |
| Speed<br>2.4 GHz<br>5 GHz | <br>300 Mbps<br>300 Mbps |
| ESD/EMP Protection | 24kV |
| Buttons | (1) Reset |
| Antennas | (2) Dual-Band Antennas |
| Wi-Fi Standard | 802.11b/g/a/n |
| Power Save | Supported |
| Wireless Security | WPA2-PSK AES/TKIP |
| Operating Temperature | 14 to 131° F (-10 to 55° C) |
| Operating Humidity | 95% Noncondensing |

FIG. 2A

| 802.11n | 6.5 Mbps to 300 Mbps (MCS0 - MCS15, HT 20/40) |
|---|---|
| 802.11a | 6, 9, 12, 18, 24, 36, 48, 54 Mbps |
| 802.11b | 1, 2, 5.5, 11 Mbps |
| 802.11g | 6, 9, 12, 18, 24, 36, 48, 54 Mbps |

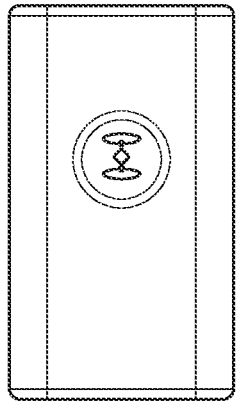
Circulating White

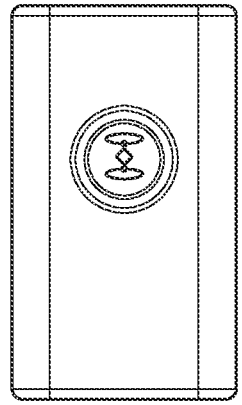
Steady Blue

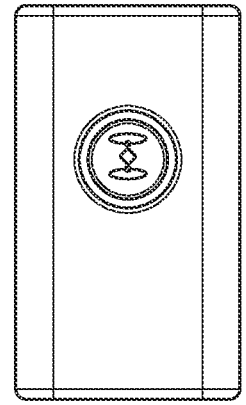
Steady Orange

In Process Connecting/ in Process Firmware Upgrading

Indicates the Device Has Been Successfully Integrated into a Network with High Network Speed.

Indicates the Device Has Been Successfully Integrated Into a Network with Medium Network Speed.

FIG. 6A  FIG. 6B  FIG. 6C

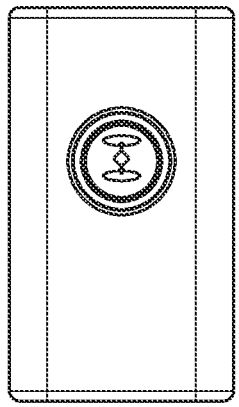
Steady Red

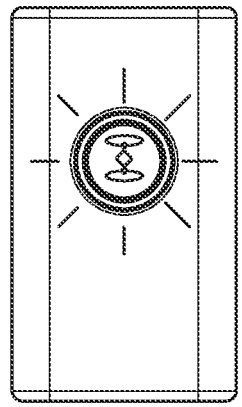
Flashing Red

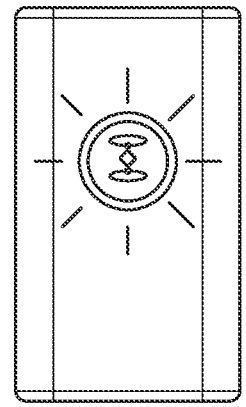
Flashing White

Indicates the Device Has Been Successfully Integrated into a Network with Poor Network Speed.

Indicates the Device is in an Isolated State.

This is Used to Locate the Device

FIG. 6D  FIG. 6E  FIG. 6F

SYSTEMS FOR AUTOMATIC SECURED REMOTE ACCESS TO A LOCAL NETWORK

CROSS REFERENCE TO RELATED APPLICATIONS

This application is a continuation-in-part of U.S. patent application Ser. No. 16/145,157, filed on Sep. 27, 2018, titled "SYSTEMS FOR AUTOMATIC SECURED REMOTE ACCESS TO A LOCAL NETWORK," now U.S. Pat. No. 11,258,764, which claims priority to U.S. Provisional Patent Application No. 62/564,251, filed on Sep. 27, 2017, titled "SYSTEMS FOR AUTOMATIC SECURED REMOTE ACCESS TO A LOCAL NETWORK," each of which are herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are apparatuses (e.g., systems and devices) and methods for remotely accessing a local (e.g., home, office, etc.) network of devices connected to a local ("home") router to open an encrypted and connection to the area network to extend the local/home area network to the remote site.

BACKGROUND

Virtual Private Networks (VPN) may be set up to allow remote and secure connection to an entire network. A VPN may set up an encrypted tunnel between a computer and a remote network. This makes VPN connections good solutions for network use where privacy or security is a concern. A VPN allows you to use your computer as if you were on a network other than your own. This technique is used by businesses so that their employees' laptops can access local resources (like file shares and such) even when the employee and their laptop are hundreds of miles away. All the laptops are connected to the corporate network via VPN so they all appear (and function) as if they are local. While historically, that was the primary use case for VPNs, people are now also turning to VPNs to help protect their privacy. Not only will a VPN connect you to a remote network, but good VPN protocols will do so through a highly encrypted tunnel, so all your traffic is hidden and protected. When using a tunnel like that, you protect yourself from a wide range of things including the security risks inherent with using a public Wi-Fi hotspot, your ISP monitoring or throttling your connection, or government surveillance and censorship. A VPN may be run from a computer on the network, or it may be run from a router, so all the computers on the network go through the secure tunnel at all times.

Although VPNs have been deployed and used successfully, they have a number of drawbacks, including cost, difficultly in setting up and maintaining and computing power requirements. Running a VPN requires specific hardware and a VPN service that may require a monthly fee to operate.

Another associated cost of a VPN is performance. VPN servers may require both processing power and bandwidth on account of the overhead introduced by the encryption protocols. Most VPNs result in a loss of a portion of the total bandwidth to the overhead of running the encrypted VPN tunnel. The overhead typically chews up about 10 percent of the total bandwidth capacity, so internet connectivity will be a little slower. In addition, if the VPN is running on a whole-house solution, it may be more difficult to access resources that are actually local, either preventing access them or resulting in slower access because of the extra leg introduced by the VPN.

Described herein are apparatuses (e.g., systems and devices) and methods that may address the problem described above.

SUMMARY OF THE DISCLOSURE

The present invention relates to apparatuses and methods that provide a secure and convenient way to establish a remote branch of a home area network, and therefore any resource connected to the home area network. The home area network is established by home router (e.g., in a home, office, public or private space, etc.). In particular, described herein are secure portal apparatuses (e.g., devices) that may be securely paired with a home router and used to provide an encrypted and direct connection between the home area network and a local network established through the portal apparatus. The secure portal device may operate as a wireless access point that shares level 2 access with the home area network.

These methods may therefore be referred to as methods of remotely extending a local area network, and/or as a method of establishing a secure, encrypted, virtual private network (VPN). These methods may include: connecting a portal device to a local internet connection, wherein the portal device comprises a housing enclosing a wireless radio, an Ethernet port and a processor wherein the processor has been paired with a home router; transmitting a request to access the home router from the portal device to a remote server; transmitting a notification of the request to access the home router by the portal device from the remote server to an administrator for the home router; exchanging, through the remote server, security certificates between the portal device and the home router after the administrator grants permission to the portal device to access the home router; providing, from the remote server, connectivity information for the home router to the portal device; establishing a direct and encrypted VPN between the portal device and the home router; and operating the portal device as a local access point using the wireless radio and processor of the portal device, wherein the local access point extends an area network of the home router through the direct and encrypted VPN.

For example, a method of establishing a secure, encrypted, virtual private network (VPN) may include: connecting a portal device to a local internet connection, wherein the portal device comprises a housing enclosing a wireless radio, an Ethernet port and a processor wherein the processor has been paired with a home router; transmitting a request to access the home router from the portal device to a remote server; periodically updating, by the home router, the remote server with current connectivity information; transmitting a notification of the request to access the home router by the portal device from the remote server to an administrator for the home router; exchanging, through the remote server, security certificates between the portal device and the home router after the administrator grants permission to the portal device to access the home router; providing, from the remote server, the connectivity information for the home router to the portal device; establishing a direct and encrypted VPN between the portal device and the home router; operating the portal device as a local access point using the wireless radio and processor of the portal device, wherein the local access point extends an area network of the home router through the direct and encrypted VPN by operating in the same layer 2 network as the area network of the home route; and receiving by the portal device, from the remote server, updated connectivity information for the home router when the direct and encrypted VPN between the portal device and the home router fails.

In any of these methods, the method may further include pairing the portal device and the home router. The two may be paired by the user (e.g., administrator) or at the factory. The pairing may be done by making a direct (cabled) connection between the two and/or by pairing the portal device and the home router while the home router and the portal device are local.

Beneficially, the portal devices described herein are small, lightweight devices that are fully contained. For example, the device may be enclosed primarily in the housing, with one or more inputs (buttons, dials, touchscreens) on the housing, and/or one or more indicators (lights, e.g., LEDs, etc.) on or through the housing. In some variations connecting comprises plugging the portal device into a wall power source, wherein the device further comprises a pronged electrical connector extending from the housing of the portal device. The pronged electrical connector may be configured to plug into to wall outlet (e.g., wall line power source) and may receive power directly and/or may charge a battery for use even when not plugged in). IN some variations a separate plug and connector (e.g., cable) may be used. In some variations the power supply is a power over Ethernet connector (POE) that may be integrated with the Ethernet connector or a separate connector. In some variations the pronged electrical connector is retractable into the housing and/or may fold down to reduce the profile of the device when not plugged into an outlet.

The portal device may be connected to a local internet connection (e.g., local relative to the portal device, which may be remote to the home network) either directly (e.g., connecting through the Ethernet connection) or wirelessly.

The step of transmitting the request may be performed by the processor automatically (e.g., automatically transmitting the request to the remote server when activated/plugged in) or manually, e.g., via the user communicating with the device either on one or more controls on the device itself or thorough a user interface (e.g., on a smartphone or other device having a processor, display and input) in communication with the portal device.

The step of transmitting the notification to the administrator may comprise displaying the request on a user interface to be viewed by the administrator, wherein the user interface displays status information about the home router. The user interface may further display status information about the portal device. In some variations, the user interface is displayed on a handheld device.

Before making a secure VPN connection with the home server, the portal device and the home server must exchange security certificates; these security certificates may comprise public keys.

Providing connectivity information for the home router may comprise providing a router IP address and a transmission control protocol/user datagram protocol (TCP/UDP) port. This information may be provided (once approved following the exchange and confirmation of the security certificates) by the remote server. Either or both the home router and the portal device may be configured to communicate securely with the same remote server; the portal device may communicate with the remote server only to establish the connection and refresh the connection (e.g., the connectivity information) should the connection to the home router fail. For example, the address of the remote server may be pre-set into the portal device and the home router device. In general, the home router may update and keep current the connectivity information in the remote server. For example, the home router may periodically (e.g., on a regular schedule and/or when changes occur in the connectivity information) update the remote server with current connectivity information. Thus, operating the portal device may further comprise receiving by the portal device, from the remote server, updated connectivity information for the home router when the direct and encrypted VPN between the portal device and the home router fails.

The portal device typically extends the area network of the home router (e.g., the home router LAN). Thus, the local access point established by the portal device may extend the area network of the home router through the direct and encrypted VPN by operating in the same layer 2 network as the area network of the home router, providing access to most or all of the same network components as if a device connected through the portal device were located proximal to the home router.

In general, prior to establishing a direct and encrypted VPN between the portal device and the home router, the portal device may operate as a captive portal. In this mode (referred to as an "isolated mode") the portal device may display, on a user interface, one or more of: instructions for connecting the portal device to the local internet connection and/or a status of the portal device connectivity to the home router.

During or immediately after the direct and encrypted VPN connection between the portal device and the home router is established, the portal device may perform a speed test to determine the quality of the connection (as a function of speed of the connection) between the home router and the portal device. For example, after establishing a direct and encrypted VPN between the portal device and the home router, the portal device may determine a speed of the VPN between the portal device and the home router. The user may then be prompted (e.g., in a user interface) to enable the normal mode for the portal device, in which it sets up the local access point extending the area network of the home router. In some variations the portal device is operated as the local access point only if the speed of the VPN between the portal device and the home router is above a speed threshold.

Also described herein are portal devices. These devices may generally be configured to function as described above. For example, a portal device for establishing a secure, encrypted, virtual private network (VPN) to extend the network of a home router at a remote location may include: a housing enclosing a processor and a wireless radio comprising one or more dual band antennas; a pronged plug extending from the housing configured so that the portal device housing may be mounted to a wall power plug; and an Ethernet port extending into the housing; a memory coupled to the processor, the memory configured to store computer-program instructions that, when executed by the processor, causes the processor to: connect to a local internet connection; transmit a request to access a home router to a remote server; exchange, through the remote server, security certificates with the home router after an administrator grants permission to access the home router; receive, from the remote server, connectivity information for the home router; establish a direct and encrypted VPN with the home router; and operate as a local access point using the wireless radio, wherein the local access point extends an area network of the home router through the direct and encrypted VPN.

As mentioned, the portal device include one or more indicator lights illuminating a portion of the housing, further wherein the one or more indicator lights are configured to indicate if the device is connected to the home router. Alternatively or additionally, the pronged plug may be configured to fold relative to the housing or retract into the housing. Some variations of the portal device do not include the pronged plug extending directly from the housing, but may include a different plug, and/or a battery.

In general, the portal devices described herein are small and lightweight. For example, the portal device have a volume that is less than about 400 $cm^3$, e.g., less than about 200 $cm^3$, less than about 100 $cm^3$, less than about 90 $cm^3$, less than about 80 $cm^3$, etc. The device may therefore be readily portable and easy to carry for use while traveling (e.g., in hotel, etc.).

In general, the computer-program instructions may be configured to perform all or some of the functions performed by the portal device in the methods described herein. For example, the computer-program instructions (which may be equivalently referred to herein as simply "instructions," "firmware" or "software") may be configured to cause the processor to automatically transmit the request to access a home router to the remote server. Thus, the portal devices described herein may be "virtual" portal devices, and may include computer-program instructions which may be operated without the requirement for a particular hardware. For example, a virtual portal device may be software operating on a smartphone, desktop or other mobile device. The computer-program instructions may be further configured to cause the processor to communicate with a user interface to display status information about the device. The computer-program instructions may be further configured to cause the processor to receive, from the remote server, updated connectivity information for the home router when the direct and encrypted VPN between the portal device and the home router fails. In some variations, the computer-program instructions may be further configured to cause the processor to operate the device as a captive portal when the direct and encrypted VPN with the home router is not established, and to display, on a user interface, one or more of: instructions for connecting the portal device to the local internet connection; a status of the portal device connectivity to the home router.

As mentioned above, the computer-program instructions may be further configured to cause the processor to, after establishing a direct and encrypted VPN between the portal device and the home router, determine a speed of the VPN between the portal device and the home router. For example, the computer-program instructions may be further configured to cause the processor to operate as the local access point only if the speed of the VPN between the portal device and the home router is above a speed threshold.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 2A illustrates exemplary specification and/or operational parameters of a secure portal device as described. These parameters are approximate only, and may be varied.

FIG. 2B illustrates exemplary operating modes and speeds in each mode.

FIGS. 4A and 4B show front and back perspective views of the front cover. FIG. 4C is a front view of the back of the front cover.

FIG. 4D is a front view of the front of the front cover. FIG. 4E is a side view of the front cover.

FIG. 4F is a top view of the front cover. FIG. 4G is a section through the front cover. FIG. 4H is an enlarged view of a corner of the cover. FIG. 4I is a bottom view. FIG. 4J is an enlarged view of an upper edge region.

FIGS. 6A-6F illustrate different operational states of a secure portal device. In FIG. 6A, the indicator LEDs on the front are shown with a circulating (rotating) white color, indicating that a connection to a wireless network is being made or that the device is in the process of upgrading the firmware. FIG. 6B shows a steady (e.g., blue) indicator, indicating that the secure portal device has successfully integrated into a network with good connection speed (connectivity). FIG. 6C shows a steady second color light (e.g., orange light), indicating that the secure portal device has integrated into a network with average connection speed. FIG. 6D shows a steady third color light (e.g., red light) indicating that the secure portal device has integrated into a network with poor speed. FIG. 6E show a flashing color light (e.g., flashing red light), indicating that the device is operating in the "isolated" state, as described below. FIG. 6F shows a flashing white light, indicating that the device is in the process of being located.

DETAILED DESCRIPTION

Figure 1A:
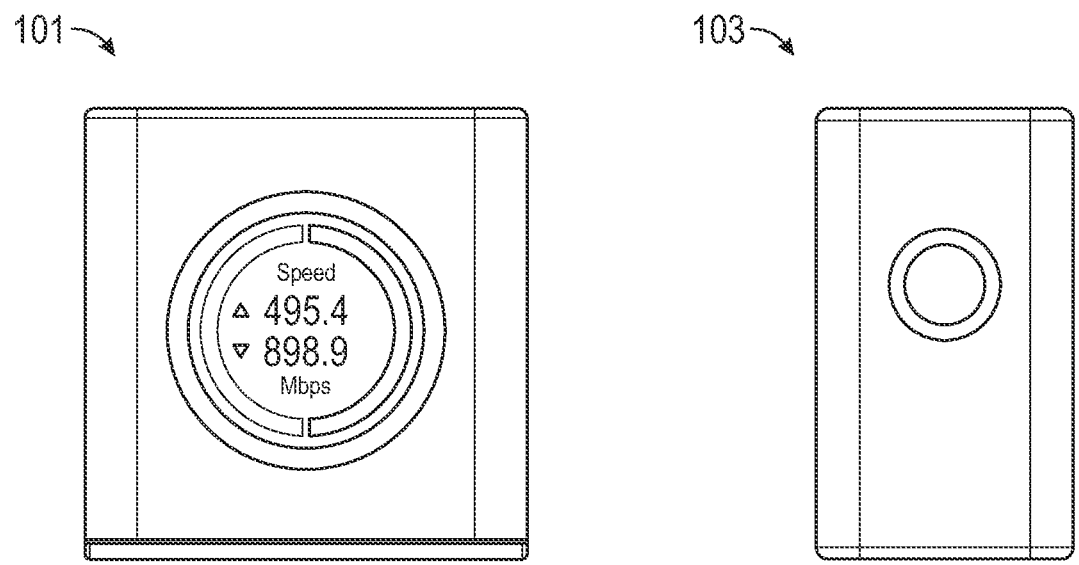
FIG. 1A is an example of a system including a router 101 and a secure portal device 103.

In general, described herein are secure portal devices (including virtual portal devices) and systems including them as well as methods of using them to remotely and securely access a local network. FIG. 1A shows an example of a secure portal device 103 that may be used with (and may be included as a system with) a router 101. These devices may be separately or jointly provided. For example they may be "factory paired" (meaning they share some common and unique info) or they may be paired separately, e.g. when purchased separately and combined for use by an end user. The exemplary router shown in FIG. 1A may be a mesh router.

In general, the secure portal device may be coupled with a router (e.g. paired). For example initially, the router and secure portal device may be connected to an Internet and may exchange information with each other (e.g., directly or more preferably via a remote server, such as a "cloud" server).

A remote server may be used, for example to: (1) notify the router user about the newly unpacked (or factory reset) secure portal device that is requesting access to connect to the router. (2) exchange security certificates (e.g., public keys) between the router and the Teleport after the router user has granted access for the secure portal device. Access granting (or rejection) may be done by using the router or via controls (e.g., a mobile app connected to the router, etc.). Security certificates may be necessary to establish a direct and encrypted VPN connection between the router and the secure portal device, as described below. (3) notify the secure portal device about the router connectivity info (e.g., router IP address and TCP/UDP port, etc.) which may be used by the secure portal device to connect to the router directly and establish an encrypted VPN tunnel between them. Connectivity info may change over time at any moment, so the router may use the cloud as a "mail box" where it puts its latest connectivity info. When a direct VPN connection between the secure portal device and router fails, the secure portal device may contact the Cloud to see if there is an updated connectivity info which should be used.

The system (including the secure portal device) may be configured so that data transmitted by the user of the secure portal device (e.g., Internet browsing, streaming etc.), never goes to the Cloud, but always is transmitted directly to/from the router. In any of these examples, the cloud is just a mediator which helps to establish a direct VPN connection.

The secure portal device may have two basic modes of operation, e.g., isolated and normal modes. In the isolated mode (as the name implies) the secure portal device doesn't provide connectivity with the router and is waiting for the secure portal device user to take some actions. In isolated mode, the secure portal device may provide a Wi-Fi AP (Access Point) with a captive portal, so that when the user connects to that AP with his mobile phone, computer, or other device, a browser may open automatically and shows a Web page which guides the user through further actions, such as: (1) Connect the secure portal device to Internet using either Wi-Fi network or Ethernet cable. For example, a typical usage may be a secure portal device user in a hotel (remote from the local/home network and router) and the user may use the hotel Wi-Fi network to connect the secure portal device to the Internet. (2) Show status information about what is currently going on with the secure portal device. For example, the secure portal device may be waiting for the access permission from the router side or the secure portal device is establishing VPN connection or the secure portal device is waiting for connectivity data from the router (e.g., waiting for a new mail in the Cloud "mail box"). (3) Speed test functionality. When direct VPN tunnel between the router and the secure portal device is established, the system may require the secure portal device user to make a speed test using secure portal device Web UI to see how good or bad the connection between secure portal device and router is. After the test is done, user may press a button to activate normal mode of the secure portal device.

When the secure portal device is in normal mode of operation it may provide a Wi-Fi AP with the name and password from the home router with name suffixed by the secure portal device (e.g., "Teleport" where the secure portal device is referred to as a "teleport" device). When the user connects to this Teleport Wi-Fi AP it gets all the connectivity as if he would be connected to the Router directly. The user of the secure portal device is in the same L2 network as Router LAN network. Thus, the secure portal device user can access not only devices connected to the router (like local file storage, TVs, etc.), but also Internet of the router. Internet browsing from the secure portal device is not distinguishable from Internet browsing when being connected to the Router directly.

If the secure portal device can't directly connect to the router for a long time or loses Internet connection then isolated mode is activated automatically to allow user to understand what is going on by displaying on a user interface the status of the portal device (e.g., disconnected, low speed, etc.).

FIGS. 3-4J and 5 illustrate an exemplary secure portal device. FIGS. 6A-6F illustrate operational modes, including those discussed above, which may be indicated by the LEDs on the front of the secure portal device.

Figure 1B:
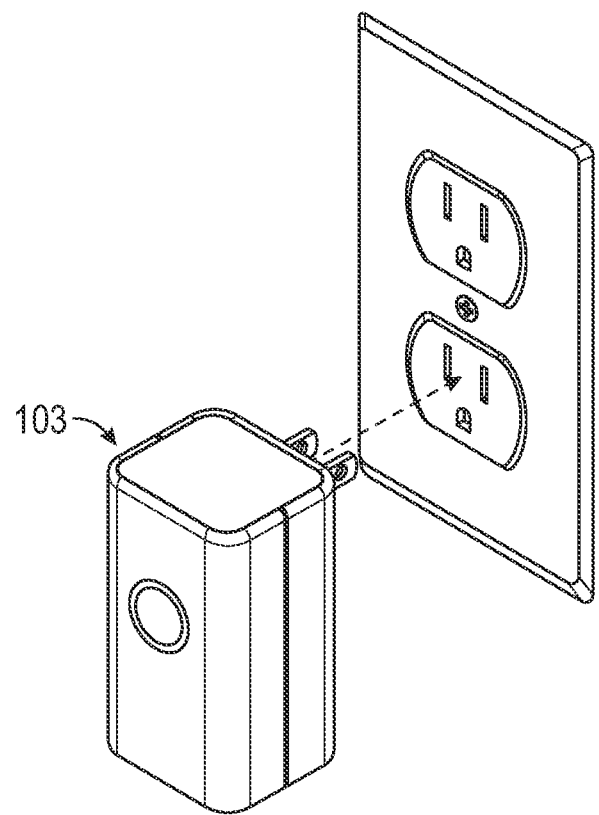
FIG. 1B illustrates attaching the secure portal device to a power outlet to power the device.
Figure 3:
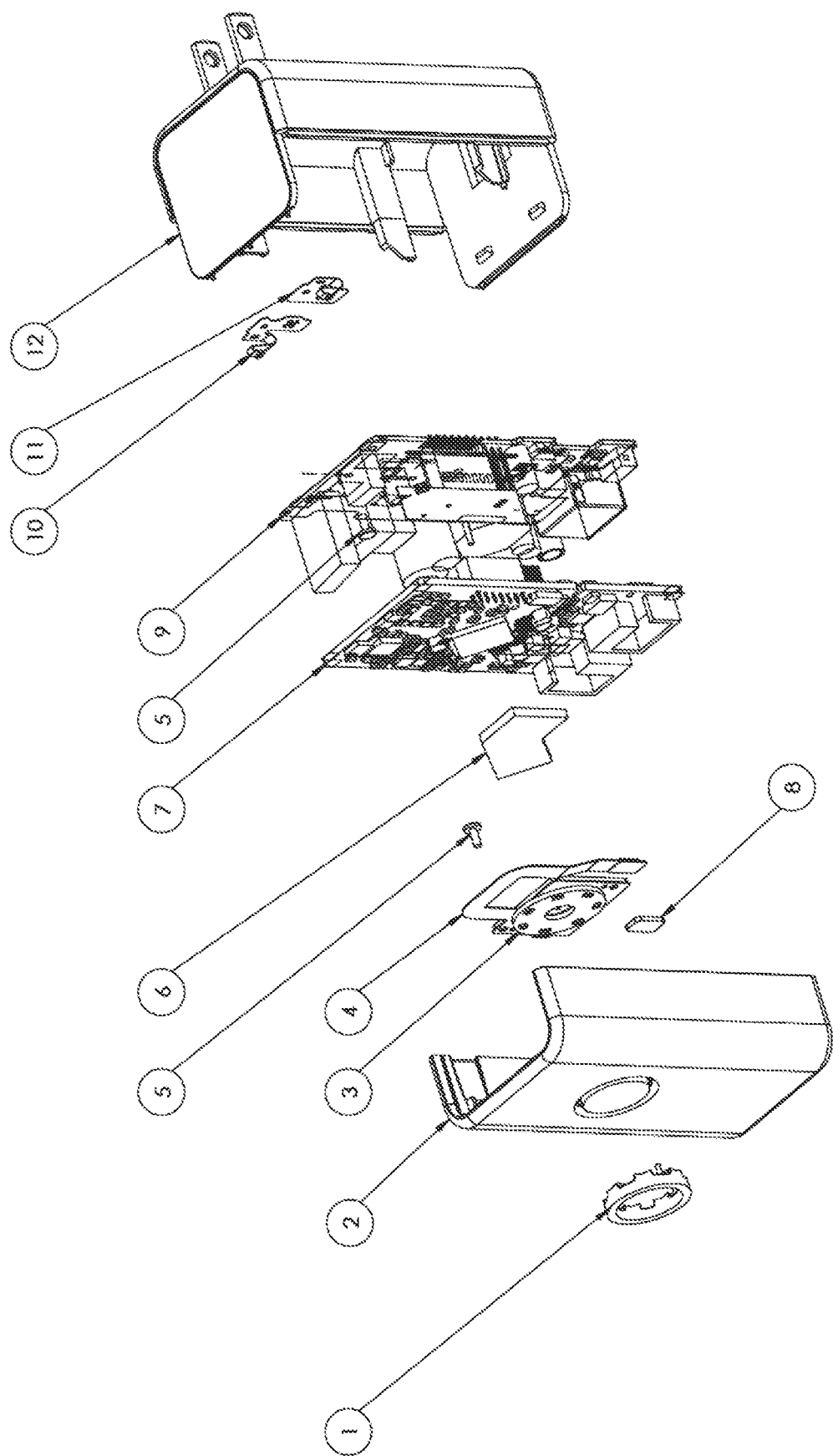
FIG. 3 is an exploded view of one example of a secure portal device, showing internal and external components, including a top cover light ring 1, a top cover 2, an LED indicator 3 and circuitry 4 that may be visible through the window 1, an attachment (e.g., self-tapping screw) 5, a thermal pad 6 and sponge 8, control circuitry for controlling the operation of the secure portal device 7, power control and radio circuitry 9, and a pair of antennas 10, 11, and a base cover 12 which may couple with the top (front) cover and enclose the control circuitry. The cover may include a plug (with or without a cord).
Figure 4A:
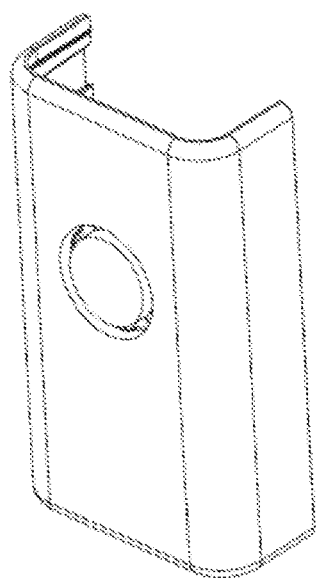
FIGS. 4A-4J illustrate component parts of an exemplary secure portal device, and may include exemplary dimensions. These dimensions may be approximate only, unless otherwise specified (and may be in millimeters or degrees).
Figure 4B:
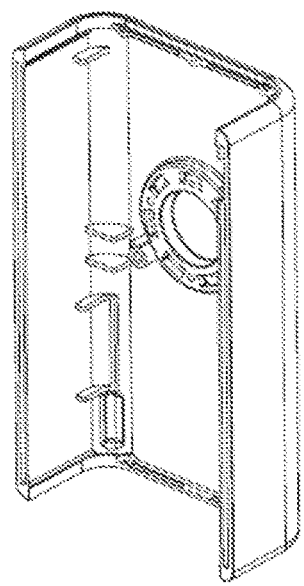
Figure 4C:
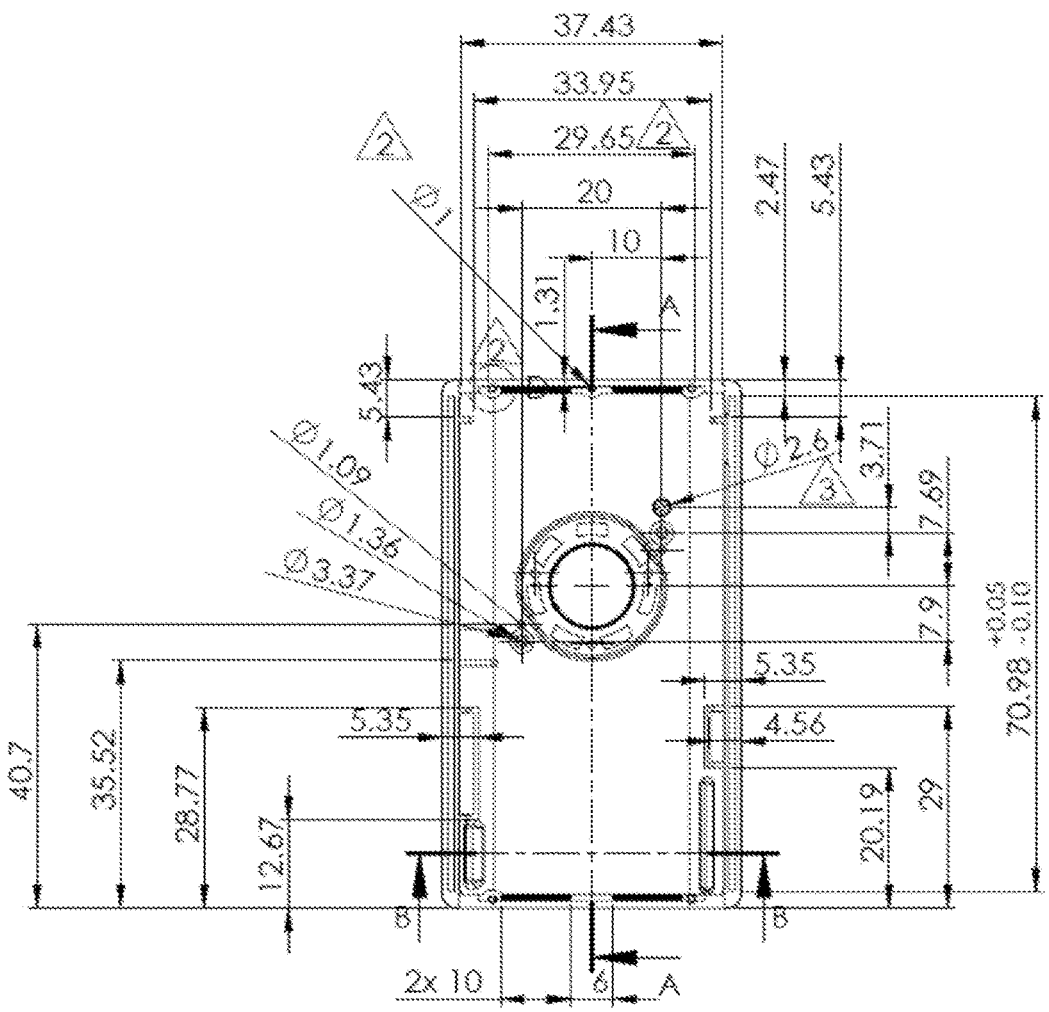
Figures 4D, 4E:
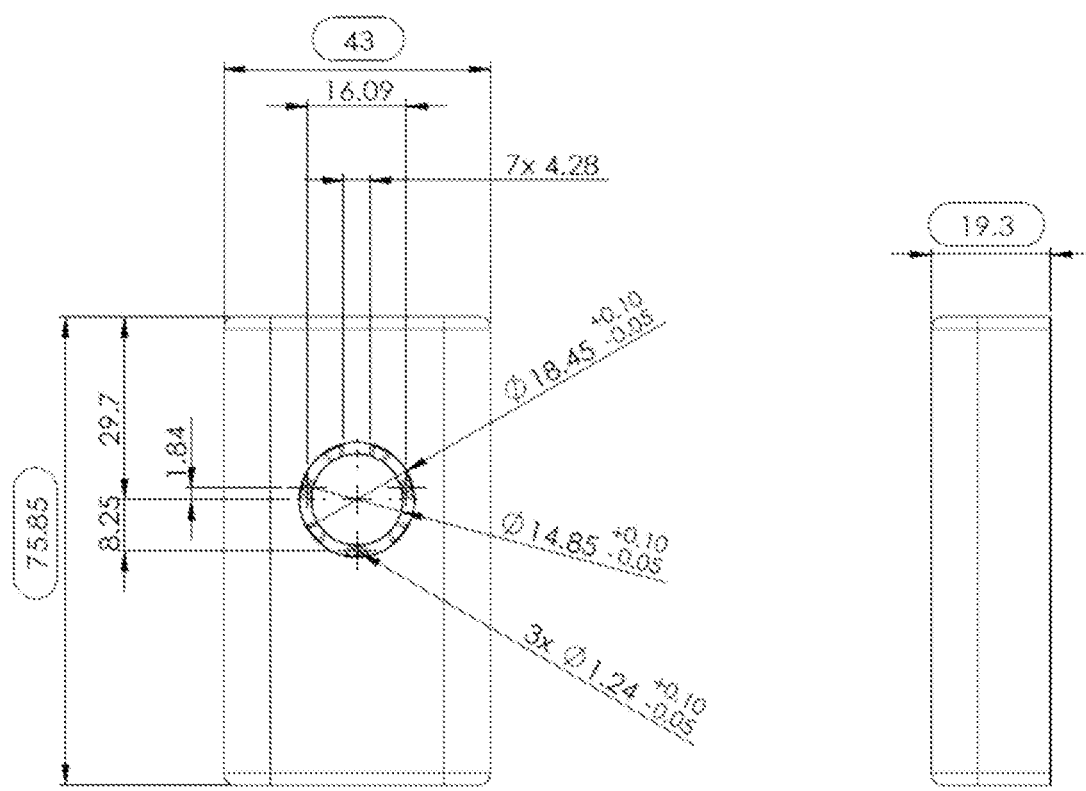
Figure 4F:
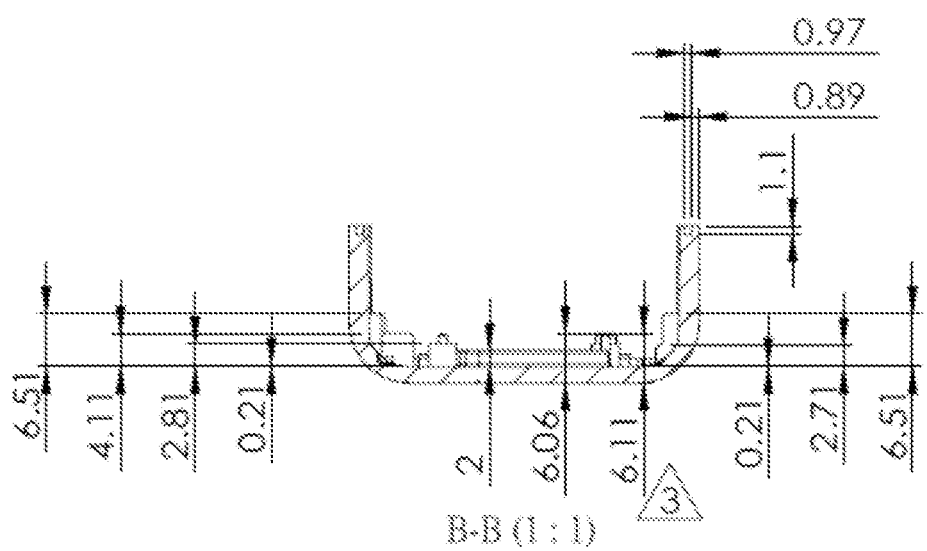
Figure 4G:
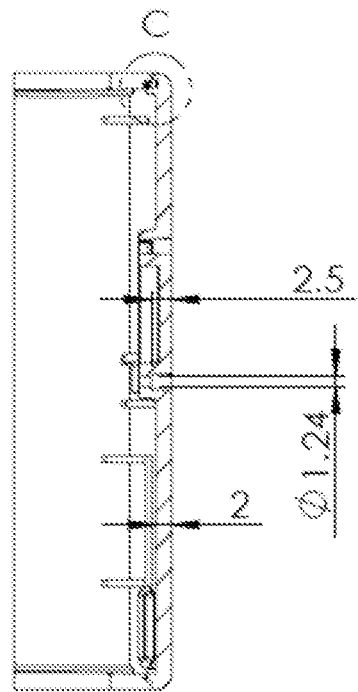
Figure 4H:
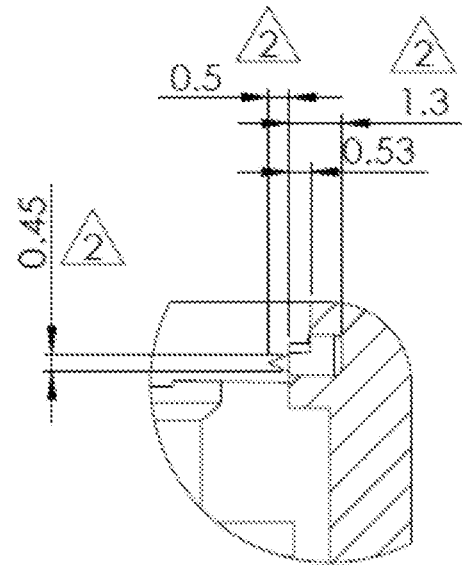
Figure 4I:
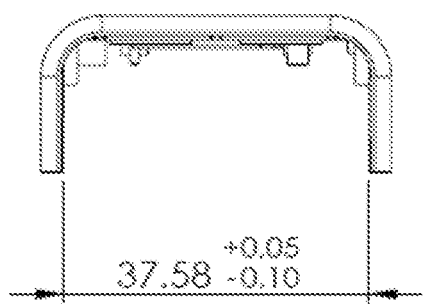
Figure 4J:
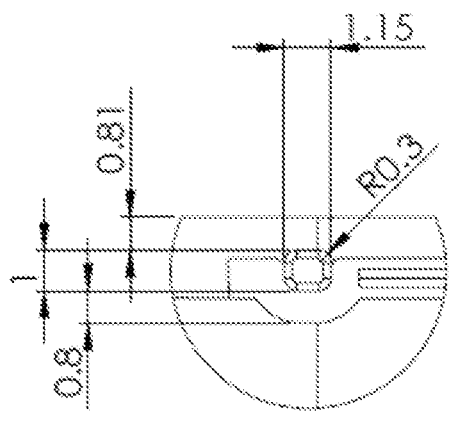
Figure 5:
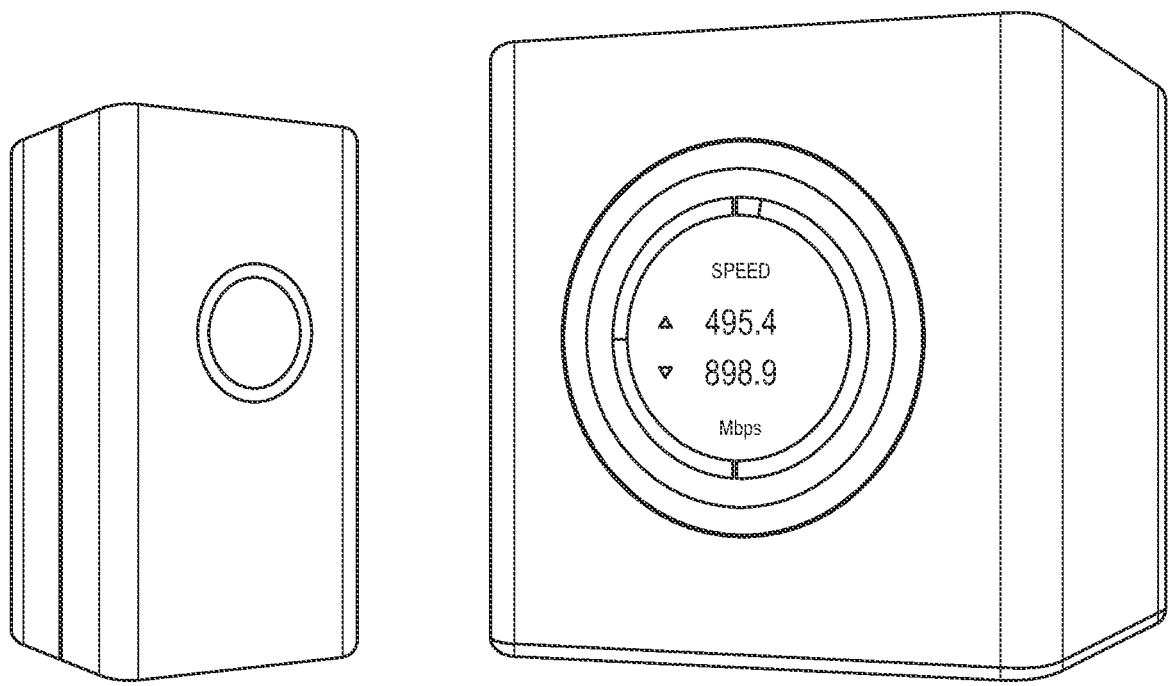
FIG. 5 is a perspective view of an embodiment of a system including a secure portal device and a router, which may be used together as a "multi-location Wi-Fi Tunnel System."
Figure 7:
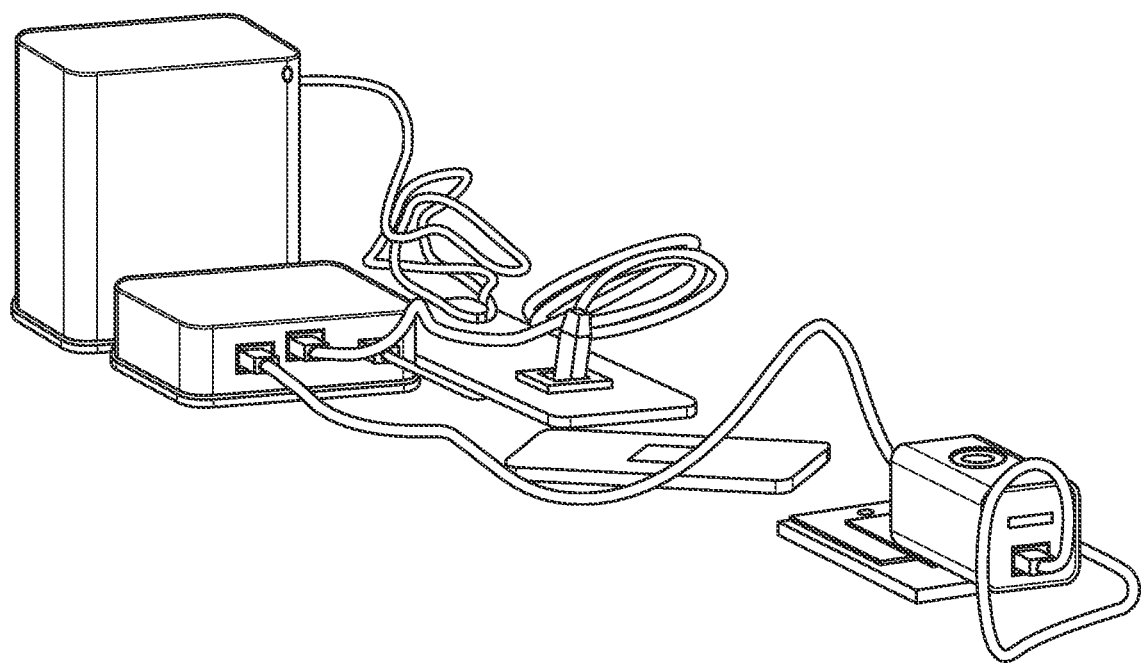
FIG. 7 illustrates an exemplary secure portal device that is being paired with a router as described herein.
Figure 8:
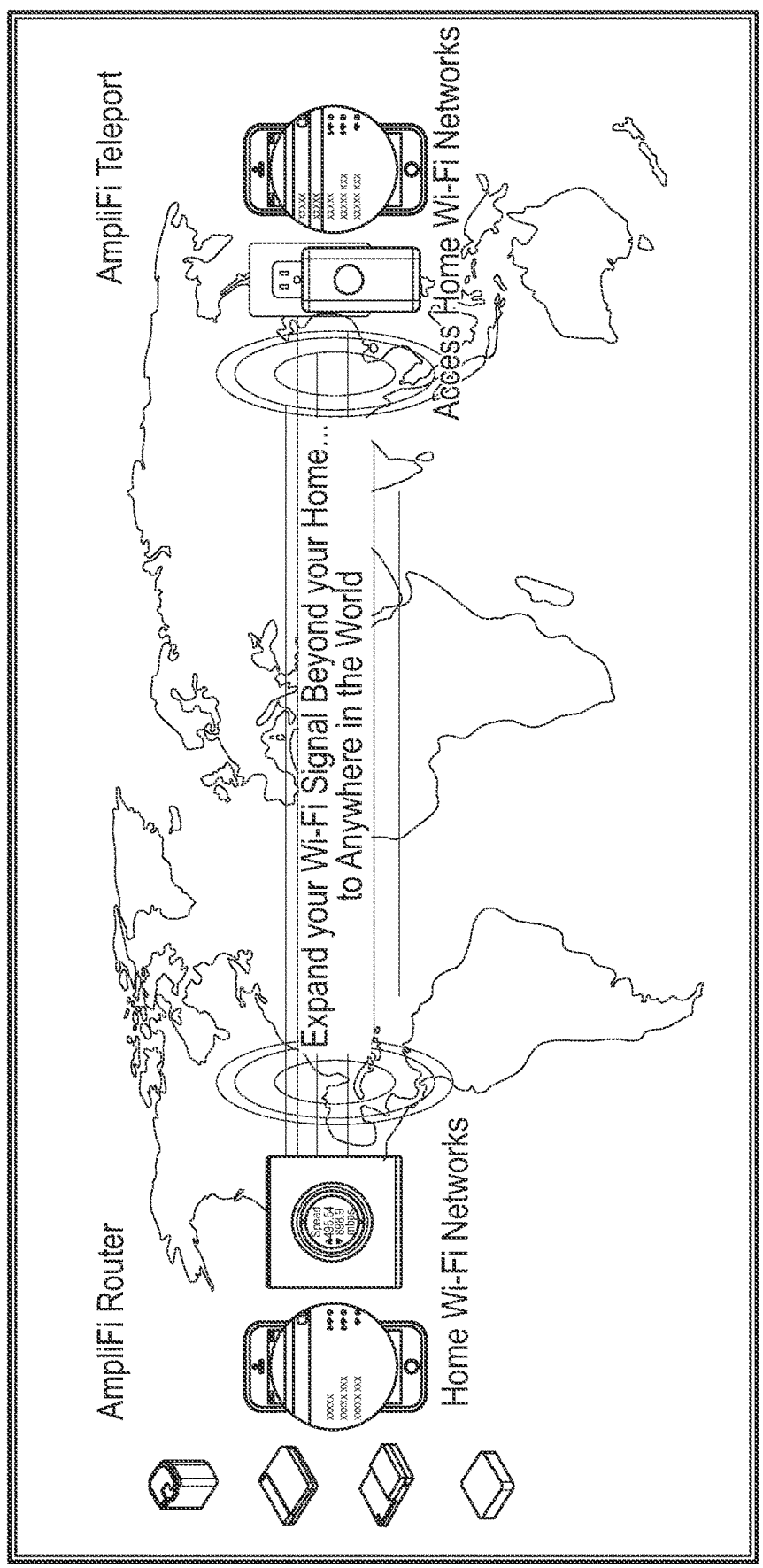
FIG. 8 graphically illustrates remote operation of the secure portal device to provide access to a user (e.g., computer) remotely located from a "local" network.

When installing the secure portal device, the device may be installed using an app (e.g. for mobile device) or a default wireless network (SSID) from a computer or tablet. To initially install (and pair) the secure portal device, the app or default network may be launched and the broadband modem powered off. One end of an Ethernet cable may be connected to the broadband modem and the other to an internet port on the router. The power (e.g. power adapter) may then be connected to the router. The secure portal device may then be connected to the power (as shown in FIG. 1B), e.g., by connecting to a power outlet. The broadband modem may then be powered on. The app may provide instructions for connecting the secure portal device to the unique wireless network (SSID) of the router. A web browser may be used to setup (e.g., automatically launching during the setup procedure), prompting for the name of the network and the password, which may be saved. The secure portal device may be setup by connecting the mobile device (or other device) to the network SSID, which may be named "Teleport Setup," for example, and a Wi-Fi network may be selected from a list of those within range of the device; the home network may be chosen (using the name chosen), and the password provided and authenticated to the network.

The secure portal device is then paired, and may be used remotely of the home network to establish a secure port. In use, the user may simply plug in the secure portal device and select the secure portal device from the list of Wi-Fi devices; the system may act as if directly connected to the router, even when separated.

Figure 9:
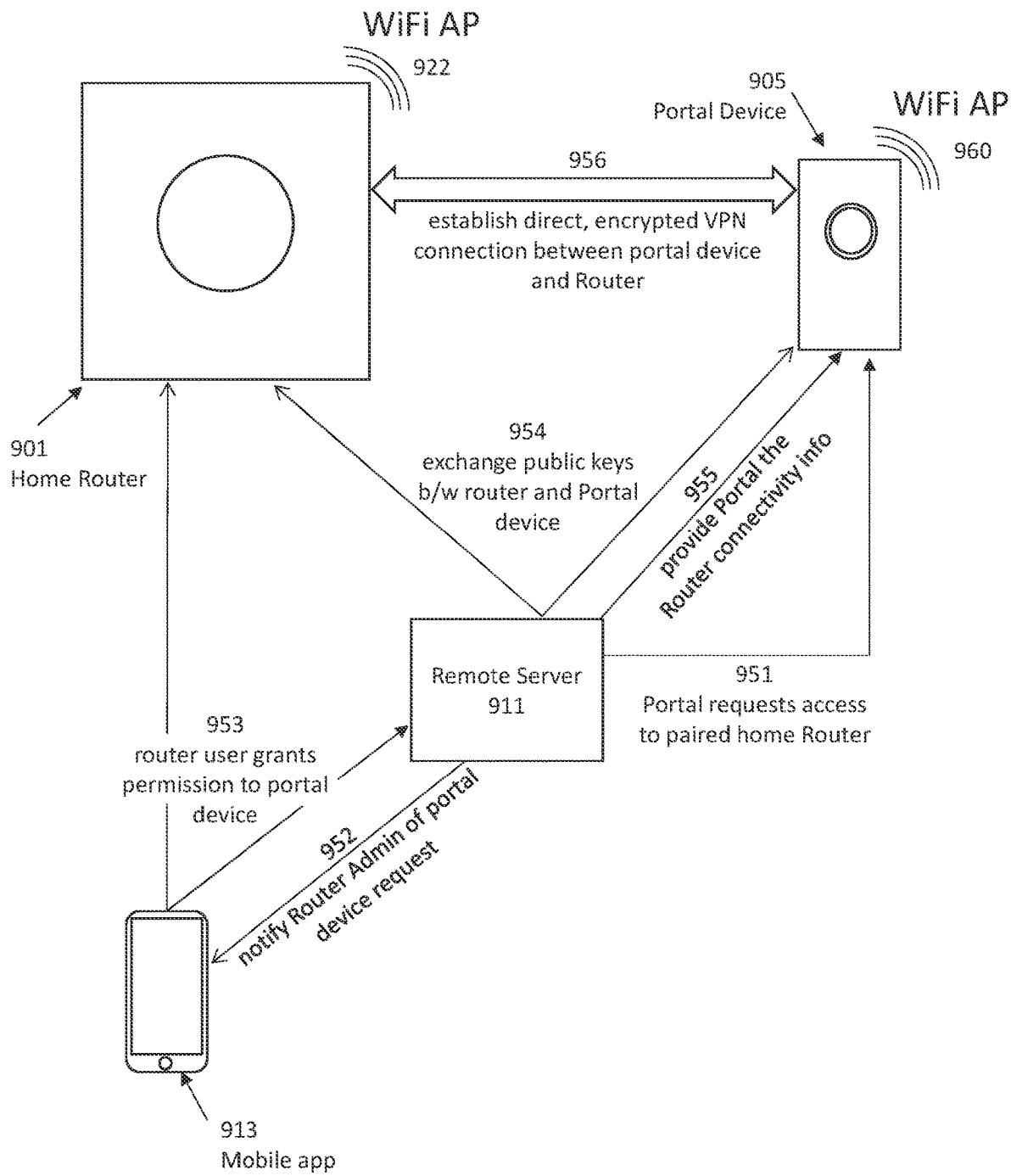
FIG. 9 is a schematic illustrating operation of the portal device to set up as a local access point that extends an area network of the home router through the direct and encrypted VPN.

FIG. 9 schematically illustrates one example of the operation of a portal device 905. In this example the portal device may initially be in an isolated mode, not connected to the home router 901. For example, the portal device may be taken by a user to a location that is remote from the home router (e.g., in a hotel, ship, office, etc.) in order to provide a secure VPN to extend 960 and allow a high level of access to the area network 922 of the home router. Prior to taking the portal device to a separate location than the home router, the two may be initially paired, so that the portal device is pre-configured to operate with a particular router, and the router is prepared to recognize the particular portal device. Pairing may be done manually (e.g., by the user/administrator) or at the factory. For convenience, the portal device 905 and home router 901 shown in FIG. 9 are illustrated as similar to the exemplary embodiments shown in FIG. 1; other form factors may be used, including virtual portal devices (e.g., computer-program instructions performing all of the functions of the portal device, as described above). For example, in FIG. 9, the portal device 905 shown may be the same device as the smartphone running the mobile app 913 shown on the bottom left of the figure.

Initially, from the remote location, the portal device may be powered on, connected to an internet connection, and a request for access to connect to the home router may be transmitted 951 to a remote server. The remote serve may be accessible through an internet connection. For example, the portal device may be connected wirelessly to a wireless network (distinct from the home server's wireless network 922). Alternatively the portal device may be connected to the internet through a wired connection to an Ethernet port on the portal device. A user (e.g., the administrator or a separate user) may monitor the portal device through a user interface (e.g., a portal user interface) that may communicate directly with the portal device. For example, prior to establishing the VPN connection to the home router, the portal device may operate in an isolated mode in which it can be accessed via a wireless connection (e.g., on a phone, laptop or other computer device) and may provide the user interface indicating the status of the portal device, and may allow the user to request connection to the home router (alternatively this may be performed automatically).

The remote server 911, upon receipt of the request to access the home router, may notify the administrator of the home router (e.g., who may be the same user or a different user) of the portal device request for access 952. This notification of the request/request may be transmitted to the administrator through a user interface (which may be distinct from the portal device user interface or associated with it, if the administrator is the same as the user); alternatively or additionally, the request may be displayed on the home router itself. In some variations the notification may be pushed as an alert to the contact information for the home router administrator stored on the remote server. In some variations, as shown in FIG. 9, the user interface may be part of a mobile app 913 (e.g., on a user's phone). In some instances the administrator is the user, and the same overall mobile application software (mobile app) may be include the user interface for both the home router (showing status and properties of the home router) and the portal device (showing status and properties of the portal device). Alternatively, a different user interface (e.g., different application software) may be used for the home router and the portal device.

The administrator may then approve (e.g., grant permission) to the portal device to access the home router 953, and this approval may again be transmitted through the remote server, which may then coordinate the exchange of security certificates (e.g., public keys) between the home router and the portal device 954. After the validity of the security certificates is confirmed, the remote server may provide the portal device with current router connectivity information, such as a router internet protocol (IP) address and a transmission control protocol and/or user datagram protocol (TCP/UDP) port 955. As discussed above, the remote server may store and keep a current version of the router connectivity information, and the home router may keep this information current (either by updating it periodically and/or automatically, e.g., when it changes, and/or the remote server may query the home router for current router connectivity information).

The portal device may then use the router connectivity information to establish a direct and encrypted VPN connection with the home router 901. While creating the VPN connection or immediately thereafter, the portal device may perform a speed test (not shown) as a measure of the fitness (e.g., data transfer rates) for the VPN connection. In some variations the estimated speed may be displayed as a qualitative (e.g., good, bad, fast/high, slow/low, medium, etc.), or quantitative, output. The user may be prompted to approve the VPN connection based on the estimate speed, or in some variations the VNP connection may be approved automatically. Approval may be based on a threshold, (e.g., a minimum speed threshold) that may be qualitative (e.g., "moderate/medium" or faster) or quantitative. Once approved, the portal device may establish a local access point (local to the portal device) Wi-Fi 960, using its internal Wi-Fi radio, that extends the area network 922 of the home router.

During ongoing operation of the local access point, if the connection to the home router (the direct VPN connection) degrades or is lost, the portal device may request updated router connectivity information from the remote server, which may then be used to re-establish the direct, encrypted VPN connection.

EXAMPLES

The portal devices described herein may create a secure virtual private network (VPN) to a home (or office or other remote) router, allowing the user to use the home internet connection and access all devices on that home network. With a VPN, the user can edit documents, connect to smart devices, etc., allowing the user to securely use their internet while away from home as though still at home.

The home router (as shown in FIG. 1A) is a white cube with a light-up base and touchscreen display. The user can cycle through screens showing the date, time, upload/download speeds, IP addresses, traffic and port statuses. In some modes it may look like a digital clock, and may weighs less than one pound. The back may be populated with four gigabit LAN ports, one gigabit WAN port and a USB-C port for the AC power adapter.

The portal device (as shown in FIG. 1A) may be a small, plug-in device with one or more Ethernet port for a wired device and a reset button. The front has an LED ring that flashes during setup and stays on when it's connected. The device may be convenient for travelling, and may include a rechargeable battery and/or may connect direction to an outlet for power (FIG. 1B). Setup of both the router and/or the portal device may be done one an app or web browser.

For example, a user may connect the home router to my modem with an Ethernet cable and may choose to set it up with a browser. Once the router booted up, the user may connect to the network and open a new browser window. The device may prompt the user to change the network name and password, which may duplicate the password for the router login. The portal device is very portable and may be plugged into an outlet and connected to a Wi-Fi network or mobile hotspot separate from the home router.

Setting up the portal device may begin by syncing the portal device with the home router. This initial step may be performed while the two are local (e.g., before travelling with it). Alternatively it may be pre-paired. The user may plug in the portal device, connect to its Wi-Fi network (different from the router's home network) and may be prompted to create a network name and password. The name should be different from the home network and the user may create a secure, complex password. The user may switch back and forth between the router's network and the portal device's network when pairing and may turn on remote access on the router.

After the portal device has paired with the router it may be used. The portal device may be plugged in and connected to a mobile device and to a Wi-Fi network outside of the home router network. Public networks like hotels, coffee shops and libraries may be used. The portal device may then replicate a local connection and act as though the user is on the home network.

The home router may be a mesh router such as a dual-band router (e.g., theoretical speeds of up to 450 Mbps on 2.4 GHz and 1,300 Mbps on 5 GHz). The portal device may match these speed or be slightly slower. In some variations the router supports MU-MIMO (multi-user, multiple-input, multiple-output), meaning it can communicate with multiple devices simultaneously. The router may also include beamforming, which allows the router to focus its signal on devices to increase strength.

Control of the home router may be through an app that may allow the user to: create separate 2.4 GHz and 5 GHz networks; change the Wi-Fi channel and width; enable band steering, which automatically connects your device to the optimal band (2.4 GHz or 5 GHz); turn on the guest Wi-Fi; hide your network name/SSID; dim the display and ambient light on the router; enable router steering, which connects your device to the main router, rather than satellite units; reboot the router or perform a factory reset; enable IPv6, port forwarding, hardware NAT, universal plug and play (UPnP), VLAN ID and bridge mode.

The portal device described herein may provide enhanced security when operating on public networks and may allow the user to stay connected to a home network when traveling.

Figure 10:
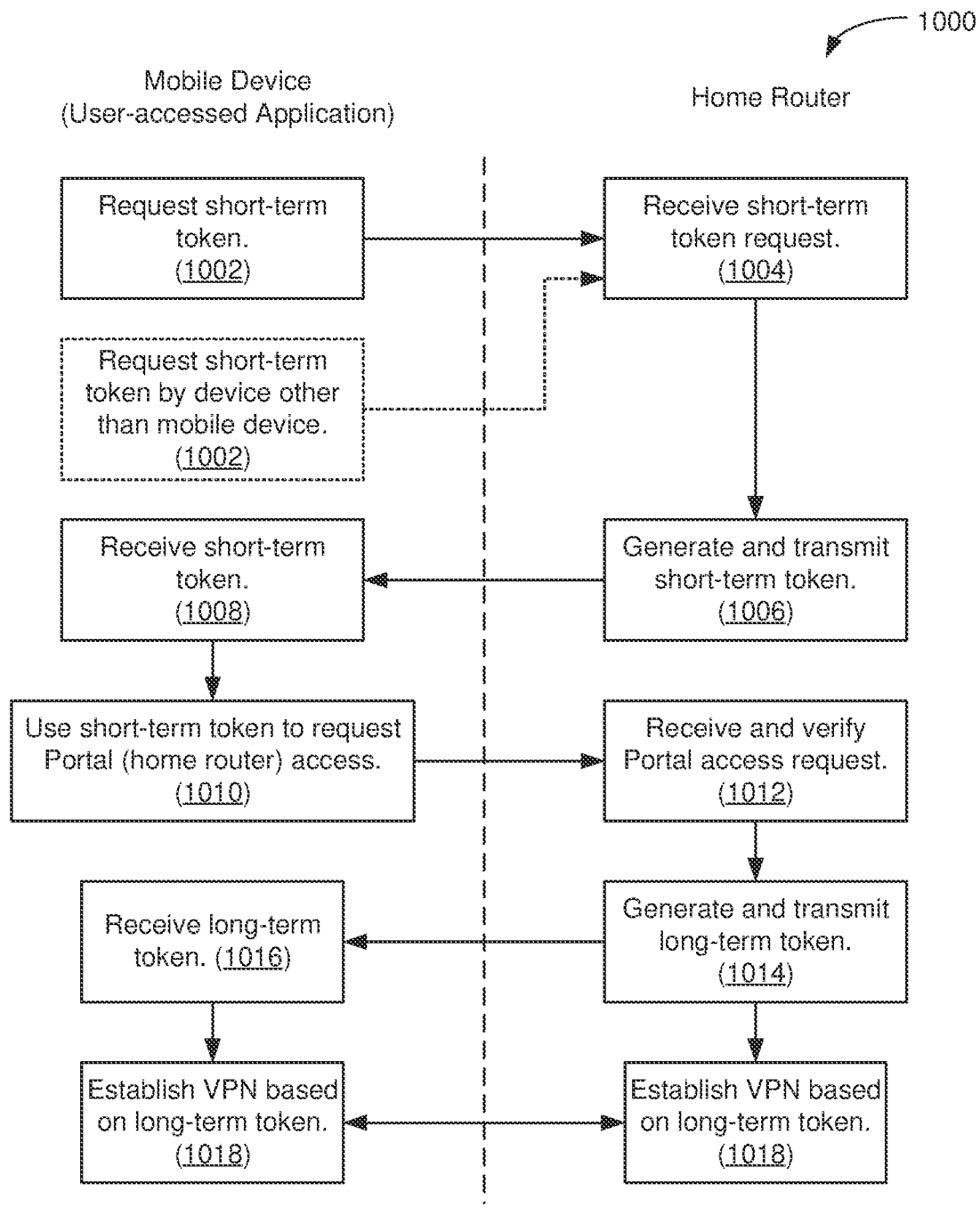
FIG. 10 is a flowchart showing an example method for establishing a VPN connection between a mobile device and a home router, in accordance with some embodiments.

FIG. 10 is a flowchart showing an example method 1000 for establishing a VPN connection between a mobile device and a home router, in accordance with some embodiments. Some examples may perform the operations described herein with additional operations, fewer operations, operations in a different order, operations in parallel, and some operations differently. The method 1000 is described below with respect to one or more devices associated with FIG. 9, however, the method 1000 may be performed by any other suitable systems or devices.

The method 1000 begins in block 1002 as a mobile device requests a short-term token from the home router. The mobile device can be a mobile phone, tablet computer, laptop computer, or the like. For example, the mobile device may be a mobile phone hosting the mobile app 913. The home router may be any feasible router such as the home router 901. To request the short-term token, the mobile device may send a message to the home router. In some variations, the mobile device may determine an internet address (e.g., IP address, TCP/UDP port, or the like) of the home router using a separate device such as a remote server. One example of a remote server may be the remote server 911. Thus, the remote server may be aware of any feasible connectivity information of the home router and the mobile device. In some variations, the remote server may track any changes associated with the connectivity of the home router and/or the mobile device. For example, the remote server may track changes in IP address, TCP/UDP port numbers, or any other connectivity information associated with the home router and/or the mobile device. In another example, the mobile device may request a short-term token through a web-interface of the home router. In this example, the home router may have a web-interface used for controlling various parameters of the home router. Additionally, in some examples, the short-term token may be requested from the home router by a device other than the mobile device (such as a different mobile device or computer) and the short-term key may be entered into the mobile device by a user (at block 1008).

Although described herein as being generated by the mobile device, in some embodiments the short-term token may be generated by another device altogether, such as a computer, a laptop, or the like. This is illustrated with dotted lines in FIG. 10. For example, a laptop may be in communication with the home router and can send the short-term token request to the home router.

In some variations, a short-token may be an encryption key. The short token may be used to encrypt messages, and in some cases, verify the identity of a sender. In some cases, the short-token may be a public encryption key or part of a public/private encryption key set. Thus, the short-token may be used for symmetric and non-symmetric encryption coding.

In block 1004, the home router may receive the short-term token request. In response to the request, in block 1006, the home router may generate and transmit a short-term token to the mobile device. The short-term token may be generated by execution of an algorithm and, in some cases, may be based on a random or pseudo-random seed. The short-term token may be valid for a predetermined time period. After the predetermined time period elapses, then the short-term token may expire. An expired short-term token may no longer be used to verify the identity of a sender. The predetermined time period may be 24 hours, one hour, ten minutes, or any feasible time period. Furthermore, the short-term key may be any feasible string of characters. In some cases, the characters may not be alpha-numeric characters, but instead may be a sequence of any eight, sixteen, thirty-two, sixty-four (etc.) bit values. In some additional examples, the short-term token may be included in a universal resource locator (URL) generated by the home router.

In block 1008, the mobile device may receive the short-term token from the home router. In response, in block 1010 the mobile device may use the short-term token to request portal (e.g., home router) access. In some cases, the mobile device may encrypt a message using the short-term token. In some other cases, the mobile device may include the short-term token with the home router access request. The request may be transmitted to the home router.

In block 1012, the home router may receive and verify the home router access request. Verification of the request may be based at least in part on the short-term token. For example, the request may have been encrypted based on the short-term token by the mobile device. The home router may decrypt the message using the same short-term token. If the message is decrypted correctly, then the request is said to be verified. The home router may verify the access request when the mobile device visits the URL generated at block 1004. The URL may be a hyperlink that routes communication from a remote server to the mobile device.

If the request is successfully verified, then in response the home router may generate a long-term token and transmit the long-term token to the requesting device (in this example the mobile device) in block 1014. The long-term token may be any feasible string of characters and may be generated using any feasible method. The long-term token may expire with respect to a predetermined time period that is greater than the predetermined time period associated with the short-term token. For example, the long-term token may expire in seven days or a month. In general, the expiry period associated with the long-term token may greater than or equal to the expiry period associated with the short-term token.

In block 1016, the mobile device can receive the long-term token. Next, in block 1018 the mobile device and the home router may establish a VPN using the long-term token. In some variations, the mobile device and the home router may use the long-term token to encrypt and decrypt messages thereby forming a secure and encrypted communication network. In some other variations, the mobile device and the home router may use the long-term token as part of a public/private key exchange with which to establish any feasible VPN.

Figure 11:
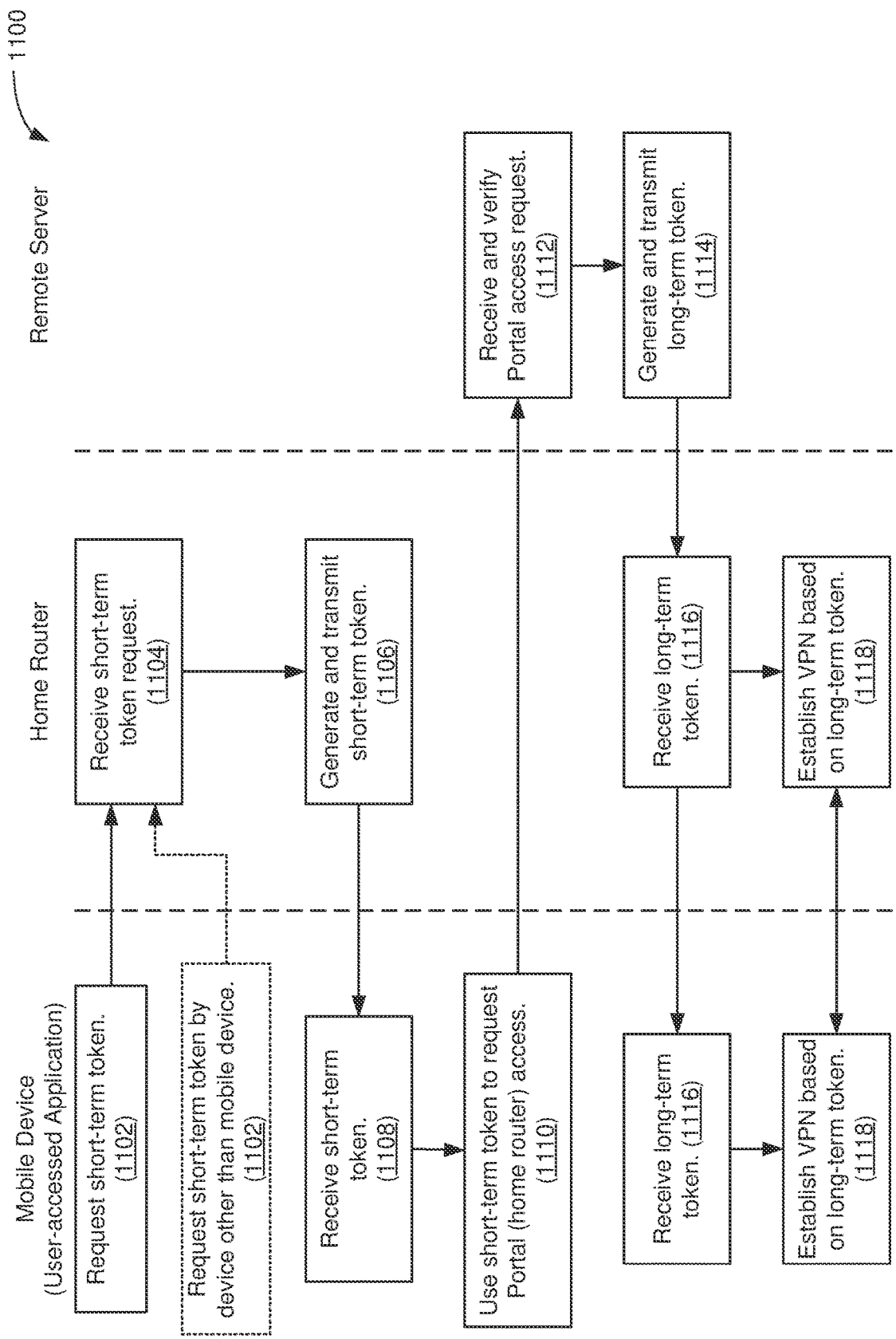
FIG. 11 is a flowchart showing an example method for establishing a VPN connection between a mobile device and a home router, in accordance with some embodiments.

FIG. 11 is a flowchart showing an example method 1100 for establishing a VPN connection between a mobile device and a home router, in accordance with some embodiments. The method 1100 is described below with respect to one or more devices associated with FIG. 9, however, the method 1100 may be performed by any other suitable systems or devices.

The method 1100 begins in block 1102 a mobile device requests a short-term token from the home router. To request the short-term token, the mobile device may send a message to the home router. In some variations, the mobile device may determine connectivity information (e.g., an internet address, IP address, TCP/UDP port, or the like) of the home router through messages from a separate device such as a remote server. In some variations, a short-token may be an encryption key to encrypt messages or verify the identity of a sender. In some cases, the short-token may be a public encryption key or part of a public/private encryption key set.

In another example, the mobile device may request a short-term token through a web-interface of the home router. In this example, the home router may have a web-interface used for controlling various parameters of the home router. Additionally, in some examples, the short-term token may be requested from the home router by a device other than the mobile device (such as a different mobile device or computer) and the short-term key may be entered into the mobile device by a user (at block 1108).

Although described herein as being generated by the mobile device, in some embodiments the short-term token may be generated by another device altogether, such as a computer, a laptop, or the like. This is illustrated with dotted lines in FIG. 11. For example, a laptop may be in communication with the home router and can send the short-term token request to the home router.

In block 1104, the home router may receive the short-term token request. In response to the request, in block 1106, the home router may generate and transmit a short-term token to the mobile device. In addition, the home router may transmit the short-term token to a remote server, separate from the home router. In some other variations, the remote server may generate the short-term token and provide the short-term token to the home router.

The short-term token may be valid for a predetermined time period. After the predetermined time period elapses, then the short-term token may expire and may no longer be used to verify the identity of a sender. The predetermined time period may be 24 hours, one hour, ten minutes, or any feasible time period.

The short-term token may also include a URL. The URL may provide the mobile device an address (IP address or the like) of a remote server. Thus, messages to the remote server may be sent or transmitted based on the URL included within the short-term token. Although described here as being generated by the home router, in some embodiments the short-term token may be generated by another device altogether, such as a computer, a laptop, or the like. For example, the other device may be in communication with the home router or the mobile device and can send the short-term token to the mobile device.

In block 1108, the mobile device may receive the short-term token from the home router. In response, in block 1110 the mobile device may use the short-term token to request portal (e.g., home router) access. In some cases, the mobile device may encrypt a message using the short-term token. In some other cases, alternatively or in addition the mobile device may include the short-term token with the home router access request. The request may be transmitted to a remote server, separate from the home router. The address of the remote server may be determined at least in part by the URL included within the short-term token.

In block 1112, the remote server may receive and verify the home router access request. Verification of the request may be based at least in part on the short-term token. As discussed above, the short-term token may be provided to, or in some cases generated by, the remote server. In some variations, the request to access the home router may have been encrypted based on the short-term token. The remote server may decrypt the message using the same short-term token. If the message is decrypted correctly, then the request is said to be verified.

If the request is successfully verified, then in response the remote server may generate a long-term token and transmit the long term token to the mobile device and the home router in block 1114. The long-term token may be any feasible string of characters and may be generated using any feasible method. The long-term token may expire with respect to a predetermined time period that is greater than the predetermined time period associated with the short-term token. For example, the long-term token may expire in seven days or a month. In general, the expiry period associated with the long-term token may greater than or equal to the expiry period associated with the short-term token.

In block 1116, the mobile device and the home router may receive the long-term token. Next, in block 1118, the mobile device and the home router may establish a VPN using the long-term token. In some variations, the mobile device and the home router may use the long-term token to encrypt and decrypt messages thereby forming a secure and encrypted communication network. In some other variations, the mobile device and the home router may use the long-term token as part of a public/private key exchange with which to establish any feasible VPN.

Figure 12:
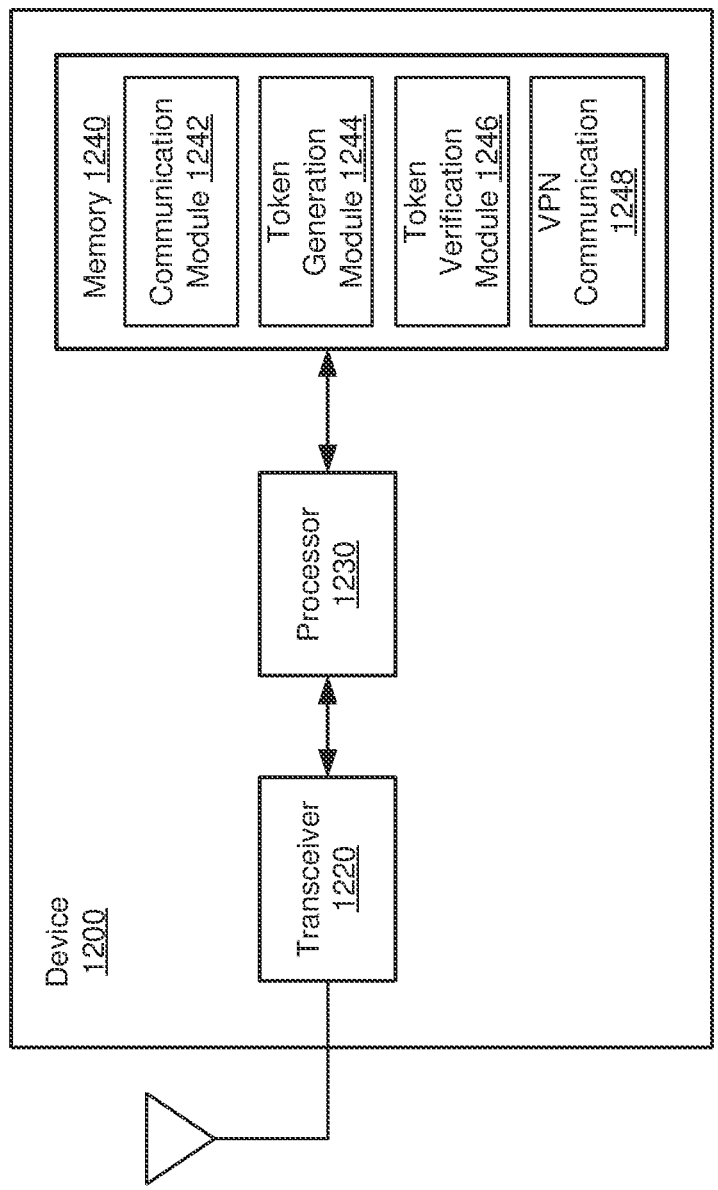
FIG. 12 shows a block diagram of a device.

FIG. 12 shows a block diagram of a device 1200 that may be one example of a mobile device, such as a device hosting the mobile app 913, the home router 901, and/or the remote server 911, each of FIG. 9. The device 1200 may include a transceiver 1220, a processor 1230, and a memory 1240.

The transceiver 1220, which is coupled to the processor 1230, may include circuits and/or devices to provide wired and/or wireless communications with any feasible device or devices. In some variations, the transceiver 1220 may include circuits and/or devices to provide Wi-Fi, Bluetooth, cellular, or any other feasible wireless communications. Alternatively, or in addition, the transceiver 1220 may include circuits and/or devices to provide wired serial, parallel, and/or ethernet communications.

The processor 1230, which is also coupled to the memory 1240, may be any one or more suitable processors capable of executing scripts or instructions of one or more software programs stored in the device 1200 (such as within memory 1240).

The memory 1240 may include a non-transitory computer-readable storage medium (e.g., one or more nonvolatile memory elements, such as EPROM, EEPROM, Flash memory, a hard drive, etc.) that may store the following software modules: a communication module 1242 to transmit and receive messages through the transceiver 1220; a token generation module 1244 to generate one or more tokens; a token verification module 1246 to verify one or more received tokens; and a VPN communication module 1248 to establish and communicate through an encrypted and secure channel.

Each software module includes program instructions that, when executed by the processor 1230, may cause the device 1200 to perform the corresponding function(s). Thus, the non-transitory computer-readable storage medium of memory 1240 may include instructions for performing all or a portion of the operations described herein.

The processor 1230 may execute the communication module 1242 to control the transceiver 1220 and communicate with other devices. For example, execution of the communication module 1242 may enable the device 1200 to transmit and receive Bluetooth, Wi-Fi, cellular, and/or ethernet-based messages with any other feasible device.

The processor 1230 may execute the token generation module 1244 to generate tokens, including short-term tokens and long-term tokens. In some embodiments, execution of the token generation module 1244 can generate a token based on a random or pseudo-random seed. In addition, the token may include a URL associated with an internet address of a server, such as a remote server. Execution of the token generation module 1244 may generate a token that may be associated with a predetermined time period. The generated token may only be valid within that predetermined time period. The token may become invalid (expire) for any time beyond (greater than) the predetermined time period.

The processor 1230 may execute the token verification module 1246 to verify tokens. For example, execution of the token verification module 1246 may determine whether any received token, including any short-term or long-term token, is valid and also determine if any received token has expired or become invalid due to time. In some cases, execution of the token verification module 1246 may decrypt messages and compare any two or more tokens to verify their validity.

The processor 1230 may execute the VPN communication module 1248 to establish encrypted and secure communications between any two devices. In some examples, the execution of the VPN communication module 1248 may use one or more tokens, including the long-term token described herein, to form an encrypted communication channel.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of establishing a secure, encrypted, virtual private network (VPN), the method comprising:
    connecting a virtual portal device to a local internet connection, wherein the virtual portal device comprises computer-program instructions operating on a processor, further wherein the virtual portal device has been paired with a home router;
    transmitting, by a remote server, a notification associated with a request for the virtual portal device to access the home router to an administrator for the home router;
    receiving, via a user interface, an approval from the administrator to access the home router in response to the notification;
    exchanging, by the remote server, security certificates between the virtual portal device and the home router in response to the administrator approval;
    providing, by the remote server, connectivity information of the home router to the virtual portal device, wherein the connectivity information includes at least an internet protocol (IP) address and at least one of a transmission control protocol (TCP) port and a user datagram protocol (UDP) port of the home router; and
    establishing a direct and encrypted VPN between the virtual portal device and the home router based at least in part on the connectivity information, wherein the virtual portal device operates as a local access point using a wireless radio and the processor, wherein the local access point extends an area network of the home router through the direct and encrypted VPN.

2. The method of claim 1, further comprising pairing the virtual portal device and the home router while the home router and the portal device are local.

3. The method of claim 1, wherein connecting the virtual portal device comprises connecting through a wireless connection.

4. The method of claim 1, wherein the security certificates comprise a tokens or keys.

* * * * *